(12) United States Patent
Nishita

(10) Patent No.: US 9,719,781 B2
(45) Date of Patent: Aug. 1, 2017

(54) MEASURING METHOD AND MEASURING INSTRUMENT

(71) Applicant: Kabushiki Kaisha TOPCON, Itabashi-ku, Tokyo-to (JP)

(72) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 407 days.

(21) Appl. No.: 14/488,744

(22) Filed: Sep. 17, 2014

(65) Prior Publication Data
US 2015/0092180 A1    Apr. 2, 2015

(30) Foreign Application Priority Data

Oct. 1, 2013    (JP) .................................. 2013-206664

(51) Int. Cl.
  *G01C 3/08* (2006.01)
  *G01C 1/04* (2006.01)

(52) U.S. Cl.
  CPC ................. *G01C 3/08* (2013.01); *G01C 1/04* (2013.01)

(58) Field of Classification Search
  CPC .......... G01C 1/04; G01C 15/002; G01C 3/04; G01C 3/08
  See application file for complete search history.

(56) References Cited

U.S. PATENT DOCUMENTS

| | | |
|---|---|---|
| 5,162,862 A | 11/1992 | Bartram et al. |
| 6,559,931 B2 | 5/2003 | Kawamura et al. |
| 2003/0048438 A1 | 3/2003 | Kawamura et al. |
| 2006/0176473 A1 | 8/2006 | Yasutomi et al. |

(Continued)

FOREIGN PATENT DOCUMENTS

| | | |
|---|---|---|
| CN | 1818551 A | 8/2006 |
| CN | 101101209 A | 1/2008 |

(Continued)

OTHER PUBLICATIONS

Chinese communication dated May 4, 2016 in corresponding Chinese patent application No. 201410516779.2.

(Continued)

*Primary Examiner* — Luke Ratcliffe
(74) *Attorney, Agent, or Firm* — Nields, Lemack & Frame, LLC

(57) ABSTRACT

The invention provides a measuring method for performing monitoring measurement on two or more objects. The method includes a step of scanning a predetermined range so as to include two or more objects to be measured, a step of acquiring digital images at a predetermined time interval so that there are two or more images which include the same object to be measured while scanning, a step of detecting an image of the object to be measured in the digital image and of setting up a minimal rectangle surrounding the image of the object to be measured, and a step of overlapping the minimal rectangles obtained in two or more digital images and of carrying out integrated processing to obtain positions of the objects to be measured in the image. The composite directional angle of each object to be measured is obtained based on the results of the integrated processing.

4 Claims, 6 Drawing Sheets

(56) References Cited

U.S. PATENT DOCUMENTS

| | | |
|---|---|---|
| 2006/0239558 A1* | 10/2006 | Rafii ................. G06K 9/00201 |
| | | 382/181 |
| 2008/0018880 A1 | 1/2008 | Matsuo et al. |
| 2012/0081690 A1* | 4/2012 | Nagai ..................... G01C 1/04 |
| | | 356/4.01 |
| 2012/0081691 A1 | 4/2012 | Nagai |
| 2015/0092181 A1 | 4/2015 | Nishita |

FOREIGN PATENT DOCUMENTS

| | | |
|---|---|---|
| CN | 102445194 A | 5/2012 |
| CN | 102445195 A | 5/2012 |
| EP | 2437028 A2 | 4/2012 |
| EP | 2437030 A2 | 4/2012 |
| EP | 2620746 A1 | 7/2013 |
| JP | 2012-73201 A | 4/2012 |

OTHER PUBLICATIONS

European communication dated Mar. 20, 2015 in co-pending European patent application No. 14187162.4.
European communication dated Mar. 20, 2015 in corresponding European patent application No. 14187172.3.
Office action mailed Mar. 22, 2017 in co-pending U.S. Appl. No. 14/488,836.

* cited by examiner

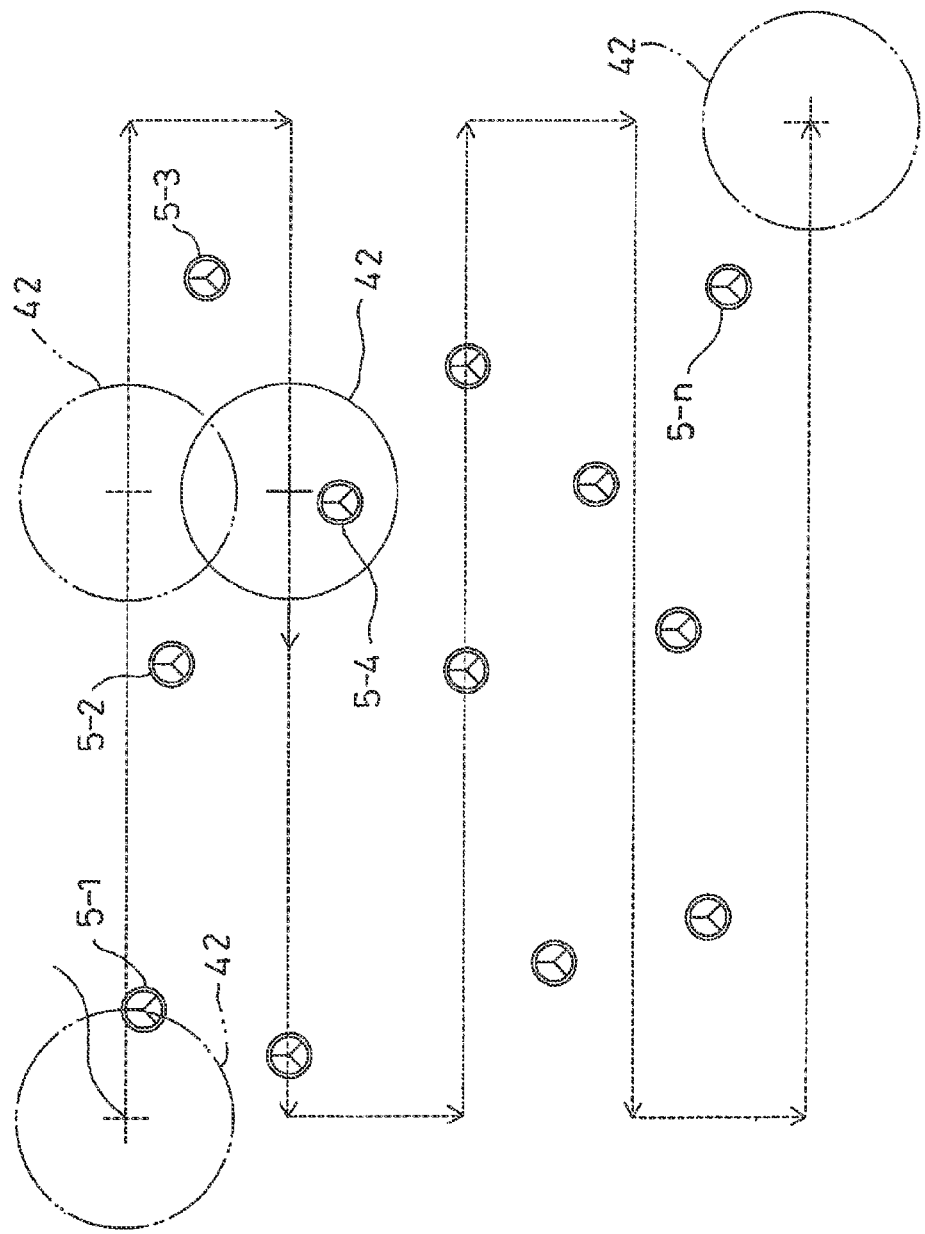

RECTANGULAR
DATA(x1, y1)(x2, y2)

JUDGED AS
ONE PRISM

MEASURING METHOD AND MEASURING INSTRUMENT

BACKGROUND OF THE INVENTION

The present invention relates to a measuring method and a measuring instrument which measures a multiple number of points periodically or continuously over time For the purposes of observing a sinking of ground, of observing a landslide, of observing a displacement of banks and walls of construction work such as a dam, of observing a displacement of wall surface of a tunnel, a multiple number of measuring points set in a measurement range are measured periodically or continuously over time by a measuring instrument.

For instance, in a case where a tunnel is dug for a construction of an underground railway, for the purpose of observing whether or not the ceiling and the wall surface of the tunnel constructed may not be displaced, a multiple number of prisms are installed as targets on the ceiling and on the wall surface and positional displacement of all the prisms are measured one after another without operator intervention by the measuring instrument (hereinafter referred as "monitoring measurement").

When the monitoring measurement is performed, the measuring instrument automatically searches the prisms, i.e. the measuring points, performs sighting, measures distances and carries out the measuring operation. In order to acquire initial values to search the measuring points as set up, it is necessary to carry out teaching operations on each of the measuring points.

In a conventional teaching operation, an operator sights each of the measuring points by a measuring instrument, measures a horizontal angle, vertical angle and distance for each of the measuring points, performs three-dimensional measurement with respect to each of the measuring points and sets the results of measurement thus obtained as initial values of each measuring point respectively. According to this method, the operator measures the measuring points one by one, and further, a view angle of a sighting telescope provided on the measuring instrument is narrow. This means that much time is required for sighting and the working efficiency is low. As a result, much time is required. In particular, in a case where there are restrictions in terms of time for the measuring operation, e.g. in a case where the operation is performed in a tunnel for an underground railway, the measuring operation must be completed during the time period when the underground railway is not in operation in order to perform monitoring measurement on the ceiling and the wall surface of the tunnel, and so the measuring time is required to be shortened.

In the Japanese Patent Application Publication. JP-A-2012-73201, the present applicant discloses a measuring method and a measuring instrument which extensively shortened the teaching operation time by acquiring images at a predetermined time interval while scanning over a preset range, detecting prisms from the images acquired, acquiring an initial value to perform searching by obtaining a coordinate position of the prism (measuring point) and carrying out teaching with respect to each of the prisms.

In the measuring method and the measuring instrument according to the Japanese Patent Application Publication JP-A-2012-73201, prisms are detected from the images and the coordinate position of the image center of the prism is measured. Because of this, if an imperfect condition, where a part of image is missing or the like, there is a case where the coordinate position of the image center may have an error with respect to the coordinate position of the prism.

SUMMARY OF THE INVENTION

It is an object of the present invention to provide a measuring method and a measuring instrument, by which it is possible to measure a coordinate position of the measuring point in the teaching operation with high accuracy.

To attain the object as described above, a measuring method according to the present invention performs monitoring measurement on two or more objects to be measured by a measuring instrument, which comprises a telescope unit for sighting an object to be measured, a distance measuring unit for projecting a distance measuring light through the telescope unit and for measuring a distance to the object to be measured, an image pickup unit for taking an image in sighting direction and for acquiring a digital image, an angle detecting unit for detecting a directional angle in the sighting direction of the telescope unit, and an automatic sighting unit for making the telescope unit perform an automatic sighting to the object to be measured, comprising a step of rotating the telescope unit in horizontal direction and in vertical direction and of scanning a predetermined range being set up so as to include two or more objects to be measured, a step of acquiring digital images at a predetermined time interval so that there are two or more images which include the same object to be measured while scanning, a step of detecting an image of the object to be measured in the digital image and of setting up a minimal rectangle surrounding the image of the object to be measured, a step of overlapping the minimal rectangles obtained in two or more digital images and of carrying out integrated processing to obtain positions of the objects to be measured in the image, a coarse measurement step of calculating a composite directional angle of each of the objects to be measured respectively based on a position in the image obtained by integrated processing and on a directional angle of a sighting axis, and a step of associating the composite directional angle obtained by the coarse measurement with each of the objects to be measured and of storing the composite directional angle as target values for automatic sighting.

Further, the measuring method according to the present invention further comprises a precise measurement step of making the telescope unit perform an automatic sighting on the objects to be measured one after another based on the stored composite directional angle and of performing distance measurement and angle measurement, and a step of associating the measurement results obtained in the precise measurement with the objects to be measured and of acquiring the measurement results as initial values.

Further, a measuring instrument according to the present invention comprises a telescope unit for sighting an object to be measured, a distance measuring unit for measuring a distance to the object to be measured by projecting a distance measuring light through the telescope unit, an image pickup unit for taking an image in sighting direction and for acquiring a digital image, an angle detecting unit for detecting a directional angle in the sighting direction of the telescope unit, an automatic sighting unit for making the telescope unit perform an automatic sighting to the object to be measured, an arithmetic processing part and a storage part, wherein the arithmetic processing part makes the telescope unit rotate in horizontal direction and in vertical direction and perform scanning over a predetermined range so as to include two or more objects to be measured, and while scanning by the image pickup unit, acquires digital images at a predetermined time interval so that there will be two or more images which include the same object to be measured, detects images of objects to be measured in the digital images, sets up a minimal rectangle surrounding the images of the objects to be measured, overlaps the minimal rectangle obtained in two or more digital images and carries out integrated processing to obtain positions of the objects to be measured in the image and calculates a composite directional angle of each of the objects to be measured respectively based on a position in the image obtained by integrated processing and on a directional angle of a sighting axis and associates a composite directional angle of the object to be measured to the object to be measured and stores to the storage part as a target value for automatic sighting.

Furthermore, in the measuring instrument according to the present invention, the arithmetic processing part makes the automatic sighting unit perform an automatic sighting of the telescope unit sequentially on the objects to be measured based on the target values stored in the storage part, executes precise measurement for distance measurement and angle measurement, associates the measurement results obtained by the precise measurement with the objects to be measured and acquires the measurement results as initial values.

According no the present invention, the measuring method performs monitoring measurement on two or more objects to be measured by a measuring instrument, which comprises a telescope unit for sighting an object to be measured, a distance measuring unit for projecting a distance measuring light through the telescope unit and for measuring a distance to the object to be measured, an image pickup unit for taking an image in sighting direction and for acquiring a digital image, an angle detecting unit for detecting a directional angle in the sighting direction of the telescope unit, and an automatic sighting unit for making the telescope unit perform an automatic sighting to the object to be measured, comprising a step of rotating the telescope unit in horizontal direction and in vertical direction and of scanning a predetermined range being set up so as to include two or more objects to be measured, a step of acquiring digital images at a predetermined time interval so that there are two or more images which include the same object to be measured while scanning, a step of detecting an image of the object to be measured in the digital image and of setting up a minimal rectangle surrounding the image of the object to be measured, a step of overlapping the minimal rectangles obtained in two or more digital images and of carrying out integrated processing to obtain positions of the objects to be measured in the image, a coarse measurement step of calculating a composite directional angle of each of the objects to be measured respectively based on a position in the image obtained by integrated processing and on a directional angle of a sighting axis, and a step of associating the composite directional angle obtained by the coarse measurement with each of the objects to be measured and of storing the composite directional angle as target values for automatic sighting. As a result, there is no need for the operator to perform sighting for each of the objects to be measured in a teaching operation, and it is possible to automate the sighting on a plurality of objects to be measured, and further, the images of the objects to be measured can be accurately specified and the directional angle of the object to be measured can be measured in a reliable manner.

Further, according to the present invention, the measuring method further comprises a precise measurement step of making the telescope unit perform an automatic sighting on the objects to be measured one after another based on the stored composite directional angle and of performing distance measurement and angle measurement, and a step or associating the measurement results obtained in the precise measurement with the objects to be measured and of acquiring the measurement results as initial values. As a result, it is possible to omit a searching operation for the detection of the object to be measured when performing a precise measurement by automatically sighting a plurality of objects to be measured, which extensively shortens the time for performing a precise measurement of a plurality of objects to be measured.

Further, according to the present invention, the measuring instrument comprises a telescope unit for sighting an object to be measured, a distance measuring unit for measuring a distance to the object to be measured by projecting a distance measuring light through the telescope unit, an image pickup unit for taking an image in sighting direction and for acquiring a digital image, an angle detecting unit for detecting a directional angle in the sighting direction of the telescope unit, an automatic sighting unit for making the telescope unit perform an automatic sighting to the object to be measured, an arithmetic processing part and a storage part, wherein the arithmetic processing part makes the telescope unit rotate in horizontal direction and in vertical direction and perform scanning over a predetermined range so as to include two or more objects to be measured, and while scanning by the image pickup unit, acquires digital images at a predetermined time interval so that there will be two or more images which include the same object to be measured, detects images of objects to be measured in the digital images, sets up a minimal rectangle surrounding the images of the objects to be measured, overlaps the minimal rectangle obtained in two or more digital images and carries out integrated processing to obtain positions of the objects to be measured in the image and calculates a composite directional angle of each of the objects to be measured respectively based on a position in the image obtained by integrated processing and on a directional angle of a sighting axis and associates a composite directional angle of the object to be measured to the object to be measured and stores to the storage part as a target value for automatic sighting. As a result, there is no need for the operator to perform sighting for each of the objects to be measured, it is possible to automate the sighting on a plurality of objects to be measured, and further, the images of the objects to be measured can be accurately specified and the directional angle of the object to be measured can be measured in a reliable manner.

Furthermore, according to the present invention, in the measuring instrument, the arithmetic processing part makes the automatic sighting unit perform an automatic sighting of the telescope unit sequentially on the objects to be measured based on the target values stored in the storage part, executes precise measurement for distance measurement and angle measurement, associates the measurement results obtained by the precise measurement with the objects to be measured and acquires the measurement results as initial values. As a result, it is possible to set up an initial value in an efficient manner in a case where the monitoring measurement is to be performed.

BRIEF DESCRIPTION OF THE DRAWINGS

FIG. 5 is an explanatory drawing to show a relation between a scanning locus, a field of view of a telescope unit and a reflection target in the present embodiment.

DETAILED DESCRIPTION OF THE PREFERRED EMBODIMENT

Description will be given below on an embodiment of the present invention by referring to the attached drawings.

First, referring to FIG. 1, description will be given on a measuring system which comprises a measuring instrument according to an embodiment of the present invention.

Figure 1:
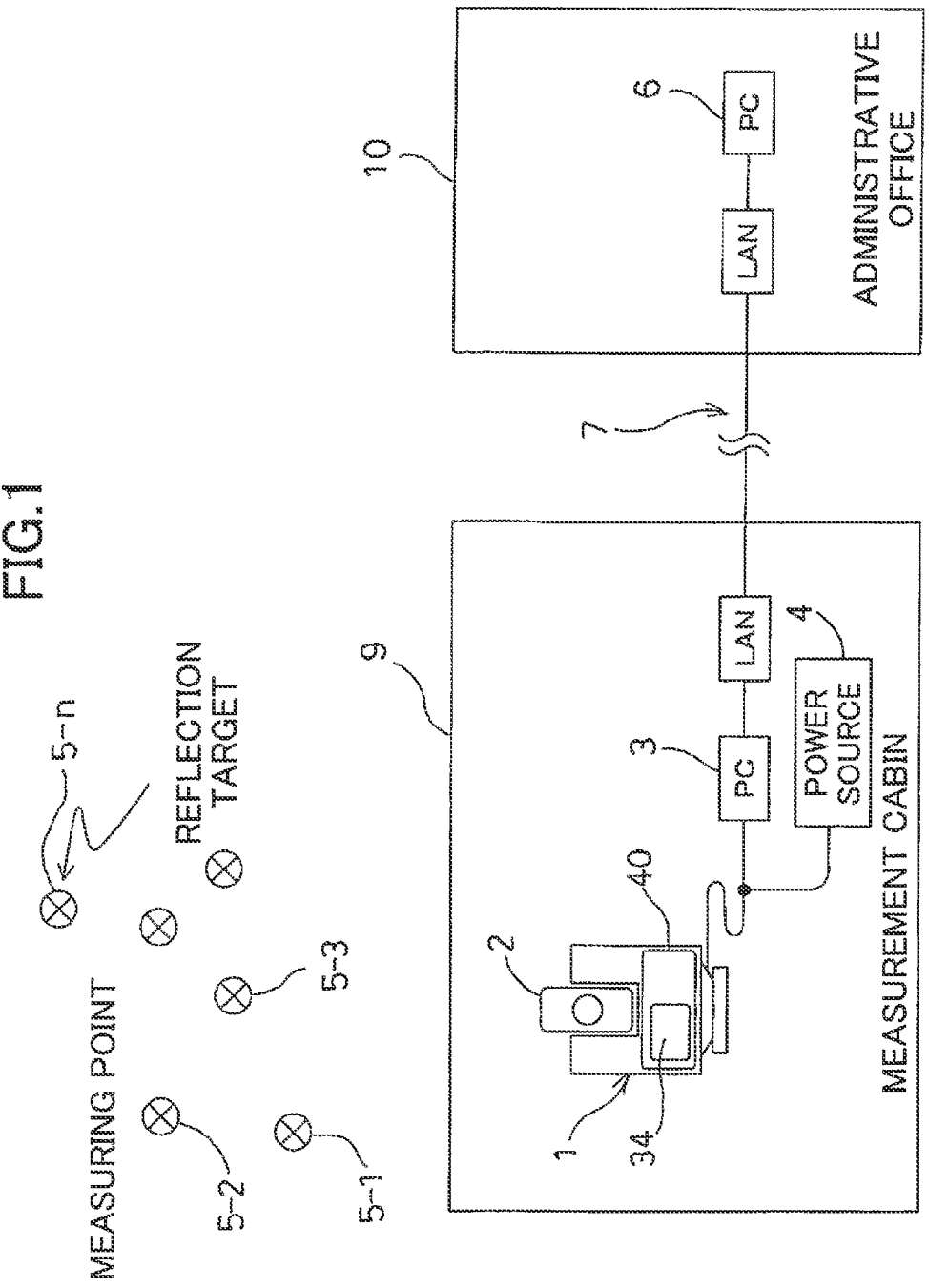
FIG. 1 is a drawing to show system configuration, which includes a measuring instrument according so an embodiment of the present invention.

In FIG. 1, reference numeral 1 denotes a measuring instrument to be installed in a measurement cabin 9. The measuring instrument 1 is provided with a telescope unit 2 and can rotate the telescope unit 2 in horizontal direction and in vertical direction and has an automatic sighting function. Reference numeral 3 denotes a measuring instrument PC, and the measuring instrument PC 3 is electrically connected to the measuring instrument 1 or is integrated with the measuring instrument 1 and issues instructions relating to the measurement. Further, the measuring instrument PC 3 accumulates measurement data obtained by the measuring instrument 1 or transmits the measurement data to a base station PC 6. Reference numeral 4 denotes a power source, and the power source 4 supplies electric power to the measuring instrument 1 and the measuring instrument PC 3. It is to be noted that although not shown in the figure, the measuring instrument 1 has a horizontal angle measuring unit 32 (see FIG. 3) and a vertical angle measuring unit 31 (see FIG. 3). Further, reference numerals 5-1, 5-2, 5-3, . . . , 5-n each denotes an object to be measured installed at a measuring point. It is to be noted that as the object to be measured, a reflective target having retro-reflectivity is used, and further, as a reflection target, a prism, a reflective sheet, or the like are used.

The base station PC 6 is installed at an administrative office 10 or the like to manage and administer tunnels, dams, etc. The base station PC 6 accumulates monitoring data transmitted from the measuring instrument PC 3, compares the received monitoring data with the monitoring data obtained in the past, and judges the present state of tunnels, dams, etc.

The measuring instrument PC 3 and the base station PC 6 can transmit and receive data communication to and from each other via a communication means 7 as required such as LAN, wireless communication, etc.

Figure 2:
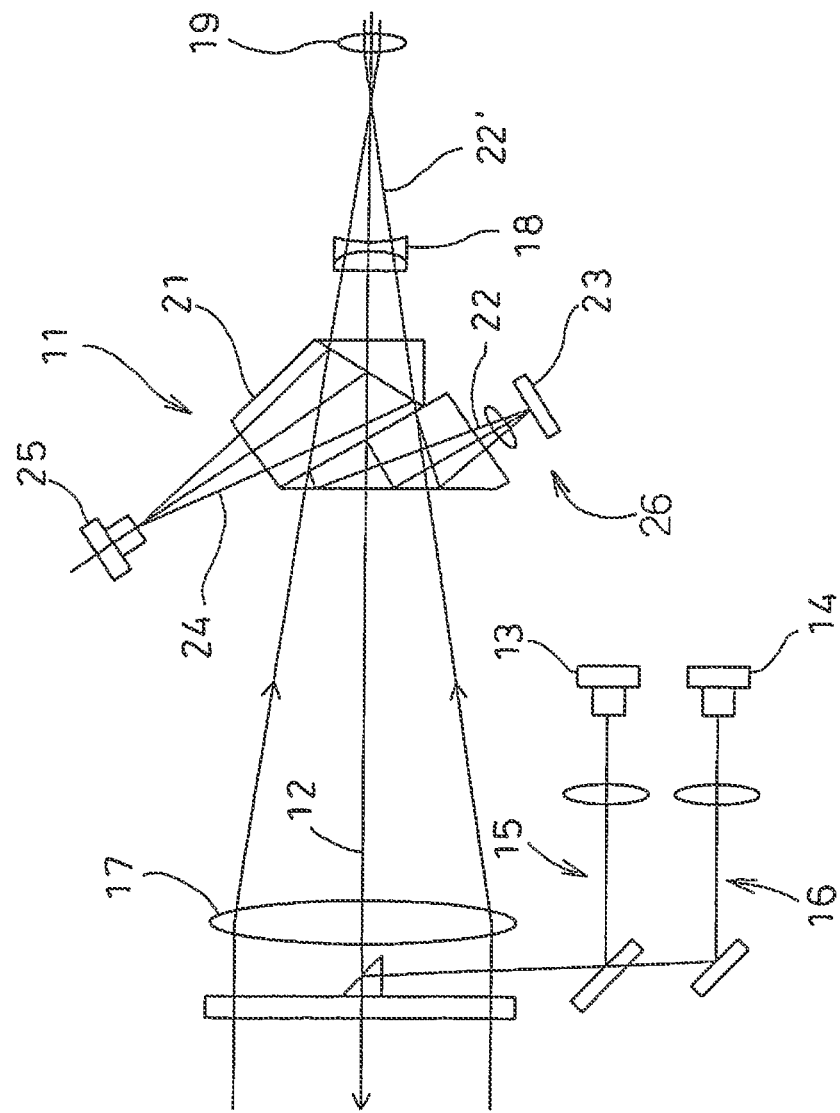
FIG. 2 is a system diagram of an optical system provided on the measuring instrument.

FIG. 2 shows an optical system 11 of the measuring instrument 1 and the optical system 11 is designed to have a fixed magnification factor. In FIG. 2, reference numeral 12 denotes an optical axis (visual axis) of the optical system 11, reference numeral 13 denotes a light source for distance measurement, reference numeral 14 denotes a light source for sighting, reference numeral 15 denotes a first light projecting optical system for guiding a distance measuring light from the light source 13 for distance measurement to the optical axis 12, reference numeral 16 denotes a second light projecting optical system for guiding a sighting light from the light source 14 for sighting to the optical axis 12, reference numeral 17 denotes an objective lens disposed on the optical axis 12, reference numeral 18 denotes a focus lens disposed on the optical axis 12, and reference numeral 19 denotes an eye piece.

The light source 13 for distance measurement is designed to emit a visible light as a distance measuring light, and the light source 14 for sighting emits an invisible light such as infrared light as a sighting light. The distance measuring light emitted from the light source 13 for distance measurement and the sighting light emitted from the light source 14 for sighting are projected on the optical axis 12 respectively. A reflection light of the distance measuring light (hereinafter referred as a "reflected distance measuring light") and a reflection. light of the sighting light (hereinafter referred as a "reflected sighting light") enter the objective lens 17 and are converged.

On the optical axis 12, a dichroic prism 21 is provided. The dichroic prism 21 reflects a reflected sighting light 22 on one reflection surface, and the reflected sighting light 22 is separated by the dichroic prism 21. The reflected sighting light 22 thus separated enter an image sensor 23.

Further, the dichroic prism 21 reflects a reflected distance measuring light 24 on the other reflection surface and the reflected distance measuring light 24 is separated. The reflected distance measuring light 24 thus separated enters a photodetection element 25 for distance measurement. A natural light 22' passes through the dichroic prism 21, and the natural light 22' after passing through enters the eve piece 19 through the focus lens 18.

The image sensor 23 is a CCD, a CMOS sensor, etc. for instance, which is an aggregate of pixels, and each pixel is designed so that each pixel can be specified on a light receiving surface (i.e. image pickup surface). Further, the image sensor 23 is so arranged that the center of the image sensor 23 coincide with the optical axis 12.

Further, a position of each of the pixels is specified by rectangular coordinates, which have the optical axis 12 as the origin. By obtaining she position of a predetermined pixel (coordinates) on the image sensor 23, a field angle of the predetermined pixel with respect to the optical axis 12 (i.e. an angle with respect to the optical axis as obtained from the position of the pixel) can be acquired. The optical system 11, the image sensor 23, etc. make up together an image pickup unit 26, and the image pickup unit 26 acquires a digital image via the image sensor 23.

In the present embodiment, an image of the reflection target 5 is detected from a digital image acquired by the image sensor 23, and based on the image of the reflection target 5, a position of the reflection target 5 on the image is obtained, and from a relative relation between the position and the optical axis 12, a vertical angle and a horizontal angle with respect to the optical axis 12 is obtained. Further, each of a vertical angle and a horizontal angle of the optical axis 12 are measured by the vertical angle measuring unit 31 and the horizontal angle measuring unit 32 respectively, and based on the vertical angle and the horizontal angle of the optical axis 12 and the vertical angle and the horizontal angle in the image sensor 23, it is designed so that a position of the reflection target 5 (i.e. a vertical angle and a horizontal angle) is detected.

Figure 3:
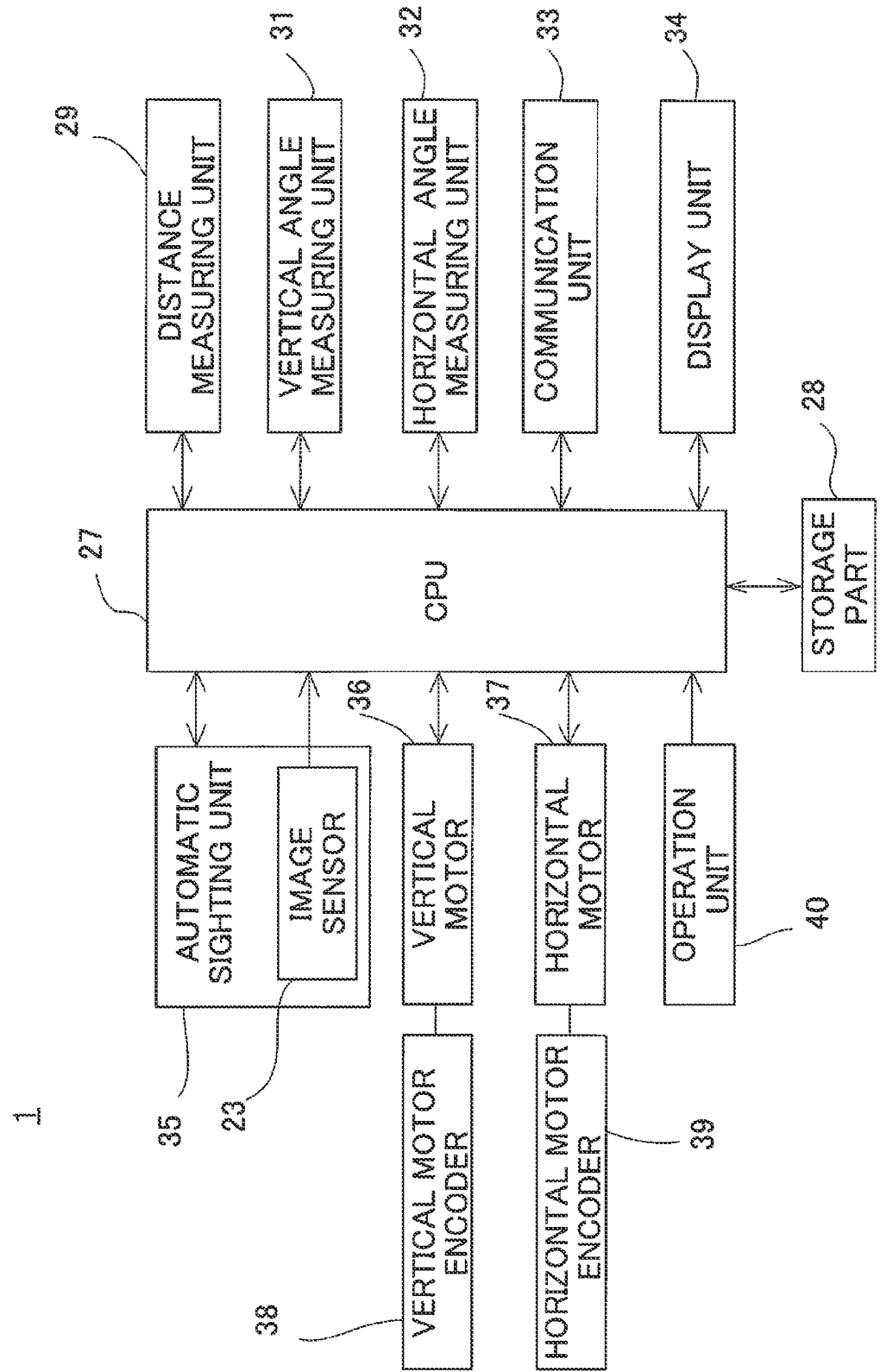
FIG. 3 is a schematical block diagram of the measuring instrument.

FIG. 3 is a block diagram to show an approximate system configuration of the measuring instrument 1. In FIG. 3, reference numeral 27 denotes an arithmetic processing part typically represented by CPU, reference numeral 28 denotes a storage part, reference numeral 29 denotes a distance measuring unit, reference numeral 31 denotes a vertical angle measuring unit, reference numeral 32 denotes a horizontal angle measuring unit, reference numeral 33 denotes a communication unit, reference numeral 34 denotes a display unit, reference numeral 35 denotes an automatic sighting unit, reference numeral 36 denotes a vertical motor for rotating the telescope unit 2 in vertical direction, reference numeral 37 denotes a horizontal motor for rotating the telescope unit 2 in horizontal direction, reference numeral 38 denotes a vertical motor encoder installed or the vertical motor 36, reference numeral 39 denotes a horizontal motor encoder installed on the horizontal motor 37, and reference numeral 40 denotes an operation unit.

The distance measuring unit 29 comprises the light source 13 for distance measurement, the photodetection element 25 for distance measurement, the arithmetic processing part 27, the storage part 28, etc. The distance measuring unit 29 performs distance measurement based on a reflected distance measuring light received by the photodetection element 25 for distance measurement.

The automatic sighting unit 35 comprises the light source 14 for sighting, the image sensor 23, the arithmetic processing part 27, the storage part 28, etc. At the automatic sighting unit 35, the reflected sighting light from the reflection target 5 is received by the image sensor 23. Based on the result of photodetection, an automatic sighting is performed to make the sighting optical axis coincide with the reflection target 5.

The vertical angle measuring unit 31 measures a vertical angle of the sighting optical axis of the telescope unit 2 and sends the measurement result to the arithmetic processing part 27 as an electric signal. The horizontal angle measuring unit 32 has a reference point and measures a horizontal angle of the sighting optical axis with respect to the reference point, and the result of measurement is sent to the arithmetic processing part 27.

The vertical motor 36 and the horizontal motor 37 are driven and controlled by the arithmetic processing part 27. A rotation amount and a rotation speed of the vertical motor 36 are detected by the vertical motor encoder 38 installed on the vertical motor 36, and a rotation amount and a rotation speed of the horizontal motor 37 are detected by the horizontal motor encoder 39 installed on the horizontal motor 37.

Based on a program (to be described later) stored in the storage part 28, the arithmetic processing part 27 performs image processing, performs distance measurement by driving the distance measuring unit 29, performs automatic sighting by driving the automatic sighting unit 35 and performs three-dimensional measurement for each of the reflection targets 5 respectively based on she measurement results from the distance measuring unit 29, the vertical angle measuring unit 31 and the horizontal angle measuring unit 32. The obtained measurement results are sent to the measuring instrument PC 3.

In the storage part 28, various types of programs are stored. These programs include, for instance: a measurement program for making the measuring instrument 1 perform the measuring operation and for acquiring three-dimensional data of the measuring points (i.e. the reflection target 5), or a sequence program for sequentially searching the measuring points and for carrying out operation such as acquisition of images by the image sensor 23, an image processing program for detecting the reflection target image from a digital image acquired by the image sensor 23, a program for detecting a reflection target position on the image by performing image processing on the detected reflection target image, a target position measuring program for obtaining a position (i.e. a horizontal angle and a vertical angle) of the reflection target 5 based on the reflection target position on the image, an automatic sighting program for sighting the telescope unit 2 on the reflection target 5 based on the position of the reflection target 5 as measured, or a teaching program for executing a teaching based on the data as measured on each of the reflection targets 5 by executing the automatic sighting program and the measurement program, or a monitoring program for executing the automatic sighting program and the measurement program at a predetermined time interval based on the teaching results, for detecting a position of each measuring point and for storing the detection results in time series at the storage part 28, and other types of programs.

Next, description will be given on the measuring instrument PC 3.

The measuring instrument 1 executes the teaching or the monitoring and thereby the measuring point data acquired are sent to the measuring instrument PC 3. The measuring instrument PC 3 stores the measuring point data in time series interrelating to each of the reflection targets 5 in time series.

Further, the measuring instrument PC 3 has programs such as a control program for making the measuring instrument 1 carry out the teaching or the monitoring and an abnormality judging program for calculating based on the measurement data as to whether there is a displacement or not and as to the extent of displacement for each of the reflection targets (measuring points) and for judging whether there is any abnormality or not.

Figure 4:
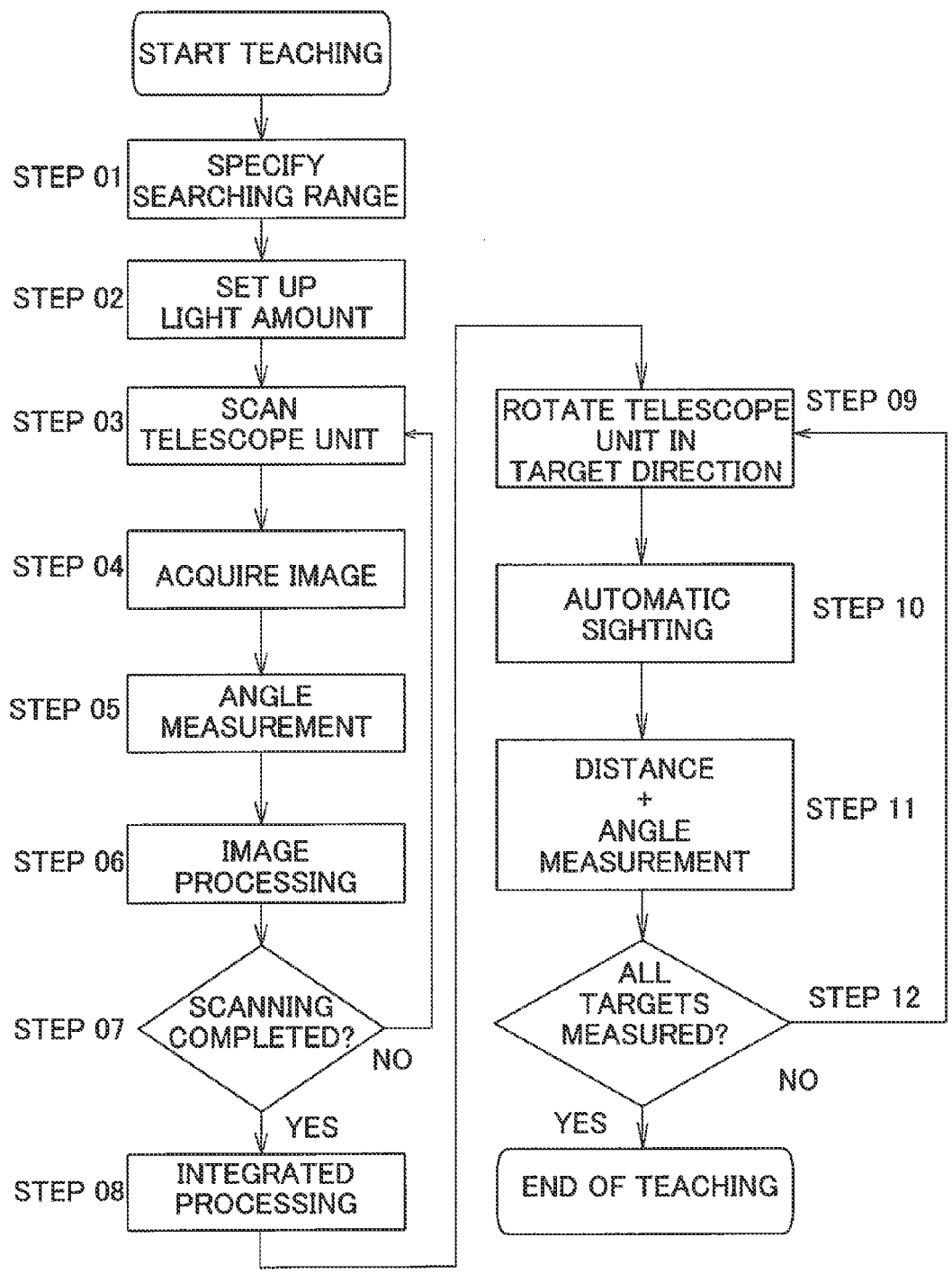
FIG. 4 is a flowchart of an embodiment of the present invention.

By referring to FIG. 4, description will be given on the teaching operation of the present embodiment.

(Step 01) A range where a reference point and a measuring point are present (i.e. searching range) is specified. As an actual method for specifying the range, as an example, the telescope unit 2 is directed toward the position of a starting point and a finishing point for performing the teaching operation, and an angle measurement value at that time are acquired from the vertical angle measuring unit 31 and the horizontal angle measuring unit 32. To direct the telescope unit 2 toward positions of the starting point and the finishing point where the teaching operation is carried out, the operator may directly operate the telescope unit 2 or the telescope unit 2 may be moved by remote control from the measuring instrument PC 3. Or, the angle measurement value may be directly specified from the operation unit 40 of the measuring instrument 1 or the angle measurement value may be specified by remote control from the measuring instrument PC 3. In a case where the display unit 34 is a touch panel, the starting point and the finishing point are set up on the display unit 34.

In a case where the reference points and the measuring points are present over a total circumference, or are present in a wide range, the starting point position and the finishing point position are not specified, and by rotating the telescope unit 2 over an angle of 360° with respect to the vertical axis, the teaching may be performed over the total circumference. What is important is that the specifying is made for a range a little wider than the range where the reference points and the measuring points are present so that all of the reflection targets 5 can be discovered in a reliable manner.

(Step 02) When the specification of the searching range has been completed, a light amount of the sighting light issued for the purpose of searching is set up. As the light amount to be set up, the light amount is set up so as to detect a sighting light reflected by the reflection target 5 located at the most distant point (e.g. maximum light amount) existing in the searching range. It is to be noted that in the teaching operation, the light amount is set up in advance or may be fixed. In this case, Step 02 is omitted.

(Step 03) Searching is performed according to a scanning pattern as set up in advance.

For the searching, the vertical motor 36 and the horizontal motor 37 are driven by using the searching function of the measuring instrument 1. The telescope unit 2 is reciprocally scanned at a predetermined speed in horizontal direction, and is rotated at a predetermined speed in vertical direction by a predetermined angle at the horizontal scanning ends. By the reciprocal scanning in horizontal direction and the rotation in vertical direction at the horizontal scanning ends, the searching range can be scanned without any omissions. At this time, the predetermined rotation angle in vertical direction is set up to an angle smaller than the view angle in vertical direction of a field of view 42 (see FIG. 5) of the telescope unit 2 so that the field of view in the upper scanning and the field of view in the lower scanning are overlapped on each other in a range as required.

(Step 04) During the scanning process, digital image data are acquired by she image pickup unit 26 at a predetermined time interval, and the acquired digital images are stored in the storage part 28. There are no specific limitations to the scanning pattern, but since the field of view 42 of the telescope unit 2 is in circular shape, in a case where the reflection target 5 is present near an upper or a lower end of the field of view 42 of the telescope unit 2, under a condition where scanning is performed in horizontal direction for instance, the reflection target 5 enters inside the field of view 42 only for a single moment. For this reason, there may be possibilities that the image of the reflection target 5 cannot be acquired, so, in a case where the scanning is performed in horizontal direction, scanning is performed with a little overlapping in up-to-down direction of the field of view 42 (see FIG. 5). Similarly, in a case where the scanning is performed in vertical direction, the time interval and the scanning speed to acquire the images are set up so that the images can be acquired with a little overlapping in left-to-right direction of the field of view 42.

Further, the relation between the scanning speed in the horizontal direction and the time interval of the image acquisition is set up in such manner that at least 2 or more of the same target appear in a plurality of images.

(Step 05) When the image is acquired in Step 04, a horizontal angle and a vertical angle (hereinafter the term "directional angle" is used for both of the horizontal angle and the vertical angle) are measured in synchronization with the acquisition of the image, and the directional angle associated with the acquired image and is stored in the storage part 28.

(Step 06) Image processing is performed on each of the images stored in the storage part 28. It is confirmed whether or not the reflection target image is present or not in the image. Further, from the images including the reflection target image, the reflection target image is detected. Further, a position in the images of the reflection target image in each of the images (i.e. a position on the photodetection surface of the image sensor 23) is obtained.

(Step 07) The procedures in Step 03 to Step 06 is repeated until the scanning with respect to the entire searching range is completed.

(Step 08) Integrated processing is carried out based on an image which include the reflection target image, on a directional angle associated with the image, and on the position of the reflection target image in the image.

The integrated processing is a processing for measuring a directional angle of an accurate reflection target by giving further consideration to a position of the reflection target image in the image.

By referring co FIG. 6A to FIG. 6C, description will be given below on the integrated processing.

First, description will be given on image processing and on obtaining of the position of the reflection target image in the image. FIG. 6A shows a relation between the field of view 42, a photodetecting area 43 and a reflection target image 44 in an image acquired while scanning. Further, FIG. 6A shows a case where the same reflection targets 5 are included in three images.

Figure 6A:
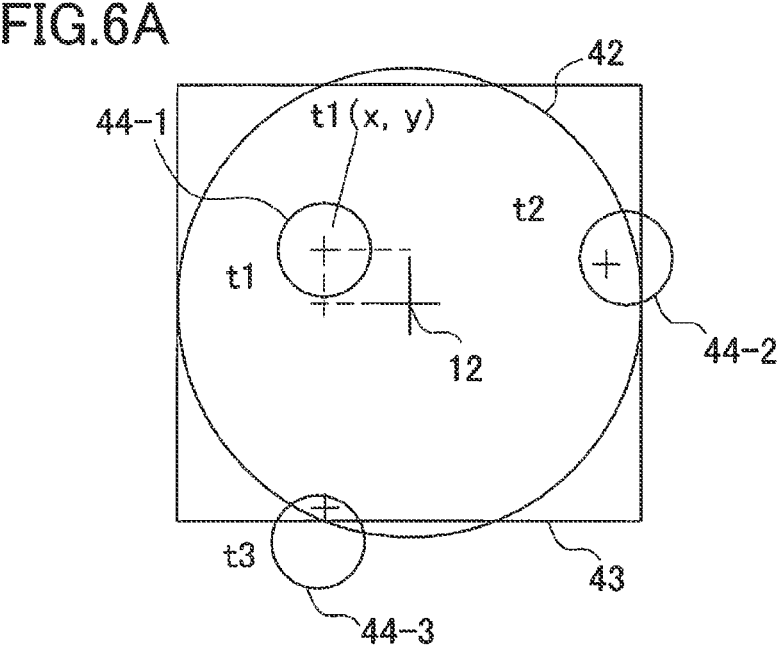
FIG. 6A is a drawing to show a relation between a field of view, a photodetecting area and a reflection target image in an image acquired while scanning.

It is to be noted that in FIG. 6A, three of the reflection target images 44 in one image are shown, but in fact, one of the reflection target images 44 is included in one image. FIG. 6A shows a condition where three images are overlapped with each other with the optical axis as the center.

Images are acquired at each of the times t1, t2 and t3 respectively. A reflection target image 44-1 is included in the image acquired at the time t1 (hereinafter referred as "image t1"), a reflection target image 44-2 is included in the image acquired at the time t2 (hereinafter referred as "image t2") and a reflection target image 44-3 is included in the image acquired at time t3 (hereinafter referred as "image t3").

Due to the timing of the photographing, the reflection target image 44-1 is a perfect image, while the reflection target image 44-2 and the reflection target image 44-3 are respective images which have lacking portions.

Figure 6B:
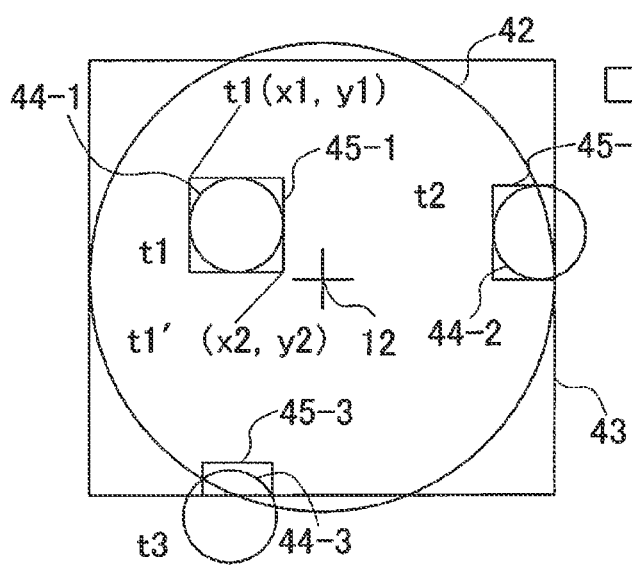
FIG. 6B is an explanatory drawing to show an image processing for measuring a position of a reflection target image.

As shown in FIG. 6B, for each image, a minimum rectangle surrounding the reflection target image 44 is set up, which is found in the field of view 42 and is included within the photodetection area 43. According to an example of FIG. 6B, the entire image of the reflection target image 44-1 within the image t1 is included in the image t1 and is an image in perfect circular shape. The minimum rectangle 45-1 surrounding the reflection target image 44-1 is in form of a square, which is in contact with the reflection target image 44-1. Further, an area of the rectangle 45-1 at this moment is the largest among the rectangles surrounding the reflection target image. It is to be noted that in a case where the reflection target image 44 is obtained by an ellipse or the like, the rectangle corresponds to a shape of an ellipse.

Further, when the rectangle 45-1 is obtained, coordinates t1 (x1, y1) and t1' (x2, y2) at positions of diagonal vertexes of the rectangle 45-1 are obtained. The coordinates in this case become coordinates within the photodetection area 43 having the optical axis 12 as an origin.

Similarly, a smallest rectangle 45-2 surrounding the reflection target image 44-2 in the image t2 is set up. The rectangle 45-2 in this case lacks a right-side portion of the reflection target image 44-2 and is a longitudinal rectangle. Further, coordinates of a diagonal vertex of the rectangle 45-2 are acquired.

Further, a minimum rectangle 45-3 surrounding the reflection target image 44-3 in the image t3 is set up. The reflection target image 44-3 in this case lacks most of its part, and only the right upper portion of the reflection target image 44-3 is a portion where the field of view 42 and the photodetection area 43 are included in common. Accordingly, the rectangle 45-3 is a small rectangle longer in horizontal direction. Similarly, coordinates of a diagonal vertex of the rectangle 45-3 are acquired. The coordinates of a diagonal vertex become a rectangular data showing a position of the rectangle and a size and a shape of the rectangle.

It is to be noted that which of the sets is to be chosen among the two sets of coordinates of a diagonal vertex is selected adequately, depending on the condition of the reflection target image 44. What is important is that the rectangular data can be acquired.

For the same reflection target 5, three images have been acquired and coordinates in each of the images have been acquired.

Since the three images have been acquired at the times t1, t2 and t3, the horizontal angle and the vertical angle of the optical axis 12 vary corresponding so the times t1, t2 and t3. From coordinates of a diagonal vertex of rectangle (i.e. coordinates in the photodetection area 43) acquired from the reflection target images 44-1, 44-2 and 44-3 and from directional angles (horizontal angle and vertical angle) of the optical axis 12 of each image, absolute coordinates of she diagonal vertex (two-dimensional coordinates) are obtained, and the rectangles are overlapped on each other based on the absolute coordinates. It is to be noted that the directional angle is measured by the vertical angle measuring unit 31 and the horizontal angle measuring unit 32.

Or, directions of the optical axis 12 are made to coincide based on the detection results of the vertical angle measuring unit 31 and the horizontal angle measuring unit 32. For instance, three images are made to coincide with the direction of the optical axis 12 acquired at the time t1 and three rectangles 45-1, 45-2 and 45-3 are further overlapped on each other.

If the reflection target image 44 is obtained with respect to the same reflection target 5, the rectangles 45-1, 45-2 and 45-3 show one portion or all of the reflection target images 44, which naturally overlaps on each other. That is, if even one portion of a plurality of the reflection target images 44 obtained are overlapped on each other, the reflection target images are judged as a reflection target image 44 of the same reflection target 5.

Figure 6C:
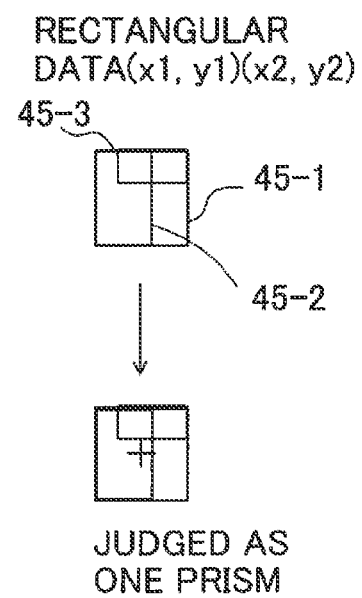
FIG. 6C is an explanatory drawing of an integrating operation of a rectangular data acquired in the image processing.

The aspect of the overlapping of rectangles is shown in FIG. 6C. Because the reflection target images 44 acquired are with the same magnification factor and at the same distance, the rectangle 45-1 of a perfect image will be the largest. Further, the rectangles 45-2 and 45-3 are each included in the rectangle 45-1 respectively. A middle point of a 2-point coordinates of diagonal vertexes of the rectangle (rectangle 45-1 in the figure) including all rectangles will be the directional angle of the reflection target 5.

It is to be noted that in a case where a perfect image of the reflection target 5 cannot be obtained, if the minimum square including an obtainable plurality of rectangles 45 is acquired, the square is regarded as a rectangle surrounding a perfect image.

A central position of the rectangle 45 is the position of the reflection target 5, and a position of the reflection target 5 in the image is converted to an angle (angle of view) having the optical axis 12 as the center. Accordingly, when the angle of view is added to the directional angle associated with the image, an accurate directional angle (composite directional angle) of the reflection target 5 can be obtained.

The integrated processing as described above is executed with respect to all of the reflection targets 5, and directional angles of all the reflection targets 5 are measured (coarse measurement). The results of the coarse measurement are stored in the storage part 28.

When measurement (coarse measurement) of directional angles for all of the reflection targets 5 has been completed, three-dimensional measurement (precise measurement) is started for each of the individual reflection targets 5 based on the results of angle measurement (target values) of the reflection targets 5.

(Step 09 and Step 10) Based on directional angle obtained by the coarse measurement, the telescope unit 2 is turned to a direction of the target value in a predetermined order, e.g. in the order of an identification number added to the reflection target 5. Since the directional angle obtained by the coarse measurement as described above is accurate, if the telescope unit 2 is directed based on the directional angle, the optical axis of the telescope unit 2 coincides with the direction of the reflection target 5.

When the setting of the direction of the telescope unit 2 is completed based on the directional angle of the coarse measurement, an automatic sighting is carried out.

The reflection target 5 intended as the object is captured by the image sensor 23 via the telescope unit 2, the reflection target 5 in the image of the image sensor 23 is detected, a deviation of the reflection target 5 with respect to the optical axis 12 is obtained, and the vertical motor 36 and the horizontal motor 37 are driven and controlled so that the deviation will be 0. The position of the reflection target 5 when obtaining the deviation can be the center of the image of the reflection target 5.

As described above, the optical axis of the telescope unit 2 coincides with the direction of the reflection target 5, and automatic sighting by the telescope unit 2 is carried out in a simple and a quick manner.

(Step 11) When sighting has been completed, distance measurement is carried out by the distance measuring unit 29, and angle measurement of a vertical angle and a horizontal angle are performed by the vertical angle measuring unit 31 and the horizontal angle measuring unit 32. The result of distance measurement and the result of angle measurement are associated with the reflection target 5 as teaching data, and also associated with the time of measurement and are recorded and stored in the storage part 28. It is to be noted that the teaching data may be sent to the measuring instrument PC 3 via the communication unit 33 and may be recorded and stored in the measuring instrument PC 3.

(Step 12) When distance measurement and angle measurement have been carried out for all of the reflection targets 5, the teaching operation is completed, and the teaching data are stored in the storage part 28 or in the measuring instrument PC 3. With the completion of the teaching and the acquisition of the teaching data, it is possible to perform automatic monitoring measurement.

The measuring instrument PC 3 controls the measuring instrument 1 in such a manner that the measuring instrument 1 performs searching, sighting and distance measuring sequentially of all prisms based on the teaching data at a predetermined time interval, and carries out monitoring measurement.

The invention claimed is:

1. A measuring method for performing monitoring measurement on two or more objects to be measured by a measuring instrument, which comprises a telescope unit for sighting an object to be measured, a distance measuring unit for projecting a distance measuring light through said telescope unit and for measuring a distance to said object to be measured, an image pickup unit for taking an image in sighting direction and for acquiring a digital image, an angle detecting unit for detecting a directional angle in the sighting direction of said telescope unit, and an automatic sighting unit for making said telescope unit automatic sighting to said object to be measured, comprising a step of rotating said telescope unit in horizontal direction and in vertical direction and of scanning a predetermined range being set up so as to include two or more objects to be measured, a step of acquiring digital images at a predetermined time interval so that there are two or more images which include the same object to be measured while scanning, a step of detecting an image of the object to be measured in said digital image, wherein the image of the object to be measured may represent an entire object to be measured or only a portion of the object to be measured, a step of setting up a minimal rectangle surrounding the image of the object to be measured, a step of obtaining coordinates of diagonal vertices of the minimal rectangle, a step of overlapping said minimal rectangles obtained in two or more digital images using the coordinates of diagonal vertices and of carrying out integrated processing to obtain positions of said objects to be measured in the image, a coarse measurement step of calculating a composite directional angle of each of the objects to be measured respectively based on a position in the image obtained by integrated processing and on a directional angle of a sighting axis, and a step of associating said composite directional angle obtained by said coarse measurement with each of the objects to be measured and of storing said composite directional angle as target values for automatic sighting.

2. The measuring method according to claim 1, further comprising a precise measurement step of making said telescope unit perform an automatic sighting on said objects to be measured one after another based on said stored composite directional angle and of performing distance measurement and angle measurement, and a step of associating the measurement results obtained in the precise measurement with said objects to be measured and of acquiring the measurement results as initial values.

3. A measuring instrument, comprising a telescope unit for sighting an object to be measured, a distance measuring unit for measuring a distance to said object to be measured by projecting a distance measuring light through said telescope unit, an image pickup unit for taking an image in sighting direction and for acquiring a digital image, an angle detecting unit for detecting a directional angle in the sighting direction of said telescope unit, an automatic sighting unit for making said telescope unit perform an automatic sighting to said object to be measured, an arithmetic processing part and a storage part, wherein said arithmetic processing part makes said telescope unit rotate in horizontal direction and in vertical direction and perform scanning over a predetermined range so as to include two or more objects to be measured, and while scanning by said image pickup unit, acquires digital images at a predetermined time interval so that there will be two or more images which include the same object to be measured, detects images of objects to be measured in said digital images, wherein the image of the object to be measured may represent an entire object to be measured or only a portion of the object to be measured, sets up a minimal rectangle surrounding the images of the objects to be measured, obtains coordinates of diagonal vertices of the minimal rectangle, overlaps said minimal rectangle obtained in two or more digital images using the coordinates of diagonal vertices and carries out integrated processing to obtain positions of said objects to be measured in the image and calculates a composite directional angle of each of the objects to be measured respectively based on a position in the image obtained by integrated processing and on a directional angle of a sighting axis and associates a composite directional angle of said object to be measured to said object to be measured and stores to said storage part as a target value for automatic sighting.

4. The measuring instrument according to claim 3, wherein said arithmetic processing part makes said automatic sighting unit perform an automatic sighting of said telescope unit sequentially on said objects to be measured based on said target values stored in said storage part, executes precise measurement for distance measurement and angle measurement, associates the measurement results obtained by said precise measurement with said objects to be measured and acquires the measurement results as initial values.

* * * * *